(12) United States Patent
Yum

(10) Patent No.: US 11,271,307 B2
(45) Date of Patent: Mar. 8, 2022

(54) ELECTRONIC DEVICE AND METHOD FOR RECEIVING RADIO SIGNAL IN ELECTRONIC DEVICE

(71) Applicant: SAMSUNG ELECTRONICS CO., LTD., Suwon-si (KR)

(72) Inventor: Jong Won Yum, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 456 days.

(21) Appl. No.: 16/326,450

(22) PCT Filed: Aug. 14, 2017

(86) PCT No.: PCT/KR2017/008822
§ 371 (c)(1),
(2) Date: Feb. 19, 2019

(87) PCT Pub. No.: WO2018/034468
PCT Pub. Date: Feb. 22, 2018

(65) Prior Publication Data
US 2021/0280974 A1    Sep. 9, 2021

(30) Foreign Application Priority Data
Aug. 19, 2016   (KR) .................. 10-2016-0105252

(51) Int. Cl.
*H04B 5/00*       (2006.01)
*H01Q 7/00*       (2006.01)
(52) U.S. Cl.
CPC ............ *H01Q 7/00* (2013.01); *H04B 5/0006* (2013.01); *H04B 5/0031* (2013.01);
(Continued)

(58) Field of Classification Search
CPC ................................ H01Q 7/00; H04B 5/0006
See application file for complete search history.

(56) References Cited

U.S. PATENT DOCUMENTS

2010/0279734 A1*  11/2010  Karkinen ............... H01Q 5/321
                                                      455/554.2
2011/0299697 A1   12/2011  Sawai
(Continued)

FOREIGN PATENT DOCUMENTS

CN        203289630       11/2013
KR    10-2006-0093512      8/2006
(Continued)

OTHER PUBLICATIONS

Extended Search Report dated Jun. 4, 2019 in counterpart European Patent Application No. 17841651.7.
(Continued)

*Primary Examiner* — Tuan H Nguyen
(74) *Attorney, Agent, or Firm* — Nixon & Vanderhye, P.C.

(57) ABSTRACT

Various embodiments relating to radio reception in an electronic device are disclosed. According to an embodiment, an earphone connector, an NFC antenna, a radio reception module, and a processor by which the radio reception module is configured to be electrically connected to the earphone connector or the NFC antenna depending on whether or not an earphone is connected to the earphone connector may be included. Additionally, other various embodiments are possible.

9 Claims, 14 Drawing Sheets

(52) U.S. Cl.
CPC ......... *H04B 5/0037* (2013.01); *H04B 5/0081* (2013.01); *H04B 5/0087* (2013.01)

(56) References Cited

U.S. PATENT DOCUMENTS

| | | |
|---|---|---|
| 2012/0159036 A1 | 6/2012 | Kim |
| 2013/0065527 A1* | 3/2013 | George ................ H04B 1/3877 455/41.2 |
| 2014/0329462 A1 | 11/2014 | Khorram et al. |
| 2016/0013548 A1 | 1/2016 | Park et al. |

FOREIGN PATENT DOCUMENTS

| | | |
|---|---|---|
| KR | 10-1075589 | 10/2011 |
| KR | 10-2012-0068274 | 6/2012 |
| KR | 10-2016-0008433 | 1/2016 |
| WO | 2011/054228 | 5/2011 |

OTHER PUBLICATIONS

International Search Report for PCT/KR2017/008822 with English-language translation, dated Nov. 20, 2017, 5 pages.
Written Opinion of the ISA for PCT/KR2017/008822, with English-language translation, dated Nov. 20, 2017, 14 pages.

* cited by examiner

| SOUND ASSESSMENT STANDARD | |
|---|---|
| GOOD | NOISE-FREE STATE |
| FAIR | NOISE, NO PROBLEM IN LISTENING |
| POOR | HEAVY NOISE, PROBLEM IN LISTENING |

FIG.8

| SOUND CONDITION | | EARPHONES | NFC ANTENNA |
|---|---|---|---|
| NUMBER OF CHANNELS PER SOUND | GOOD | 19 | 17 |
| | FAIR | 10 | 5 |
| | POOR | 4 | 11 |
| TOTAL NUMBER | | 33 | 33 |
| VALID NUMBER | | 19 | 17 |

FIG.9

| SOUND CONDITION | | EARPHONES | NFC ANTENNA |
|---|---|---|---|
| NUMBER OF CHANNELS PER SOUND | GOOD | 11 | 8 |
| | FAIR | 2 | 2 |
| | POOR | 0 | 4 |
| TOTAL NUMBER | | 13 | 11 |
| VALID NUMBER | | 11 | 8 |

FIG.10

ELECTRONIC DEVICE AND METHOD FOR RECEIVING RADIO SIGNAL IN ELECTRONIC DEVICE

This application is the U.S. national phase of International Application No. PCT/KR2017/008822 filed 14 Aug. 2017, which designated the U.S. and claims priority to KR Patent Application No. 10-2016-0105252 filed 19 Aug. 2016, the entire contents of each of which are hereby incorporated by reference.

FIELD

Various embodiments of the disclosure relate to an electronic device and a method for receiving a radio signal thereby.

DESCRIPTION OF RELATED ART

Recently, various electronic devices, such as a mobile phone, an MP3 player, a Portable Multimedia. Player (PMP), a tablet Personal Computer (PC), a Galaxy Tab, a smartphone, an iPad, and an E-book reader, have been provided for users, and a user can experience diverse types of content using such various electronic devices.

An electronic device includes not only a voice call function or a data communication function but also various additional functions for user convenience. Among the various additional functions, the electronic device may provide a radio reception function.

To provide a radio signal reception function, an electronic device is required to have a radio reception circuit and an antenna. Generally, earphones are used as a receiving antenna in an electronic device when users listen to the radio via earphones. For example, an electronic device is configured such that the ground of earphones serves as an antenna for receiving a radio signal once the earphones are connected to an earphone connector instead of installing any separate antenna for receiving a radio signal.

SUMMARY

However, in a method of receiving a radio signal through earphones, it is impossible to receive a radio signal when earphones are not connected, and a user cannot listen to a radio signal through a speaker, a wireless headset, or the like. Further, in the method of receiving a radio signal through earphones, since a user needs to listen to the radio with earphones always connected, using earphones during walking may increase the risk of traffic accidents and wearing earphones may damage hearing.

An electronic device needs a separate radio reception antenna in order to enable radio reception without connecting earphones. However, mounting a separate radio reception antenna in an electronic device requires an additional installation space and may cause additional component costs.

According to various embodiments of the disclosure, it is possible to provide an electronic device and a radio signal reception method of an electronic device that enable radio signal reception via a Near-Field Communication (NFC) antenna provided in an electronic device without mounting a separate radio reception antenna.

According to various embodiments of the disclosure, it is possible to provide an electronic device and a radio reception method of an electronic device that enable radio reception via an NFC antenna provided in an electronic device, thus allowing a user to listen to the radio through a speaker, a wireless headset, or the like.

According to various embodiments, an electronic device may include: an earphone connector; an NFC antenna; a radio reception module; and a processor configured to electrically connect the radio reception module with the earphone connector or the NFC antenna depending on whether earphones are connected to the earphone connector.

According to various embodiments, a method for receiving a radio signal in an electronic device may include: determining whether earphones are connected to an earphone connector when a radio application is executed; and electrically connecting a radio reception module with the earphone connector or an NFC antenna depending on whether the earphones are connected to the earphone connector.

According to various embodiments, a storage medium may store a radio reception program, wherein the program may perform, in an electronic device: an operation of determining whether earphones are connected to an earphone connector when a radio application is executed; and an operation of electrically connecting a radio reception module with the earphone connector or an NFC antenna depending on whether the earphones are connected to the earphone connector.

According to various embodiments of the disclosure, since radio signal reception is enabled via an NFC antenna provided in an electronic device, it is not necessary to mount a separate radio reception antenna, thus not requiring an additional installation space and reducing component costs.

According to various embodiments of the disclosure, radio signal reception is enabled via an NFC antenna provided in an electronic device, thus allowing a user to listen to the radio through a speaker, a wireless headset, or the like.

BRIEF DESCRIPTION OF THE DRAWINGS

FIG. 8 is a table illustrating sound assessment standards according to various embodiments.

FIG. 9 is a table illustrating the results of a sound test in a strong electric field according to various embodiments.

FIG. 10 is a table illustrating the results of a sound test in a weak electric field according to various embodiments.

DETAILED DESCRIPTION OF EXAMPLE EMBODIMENTS

Figure 1:
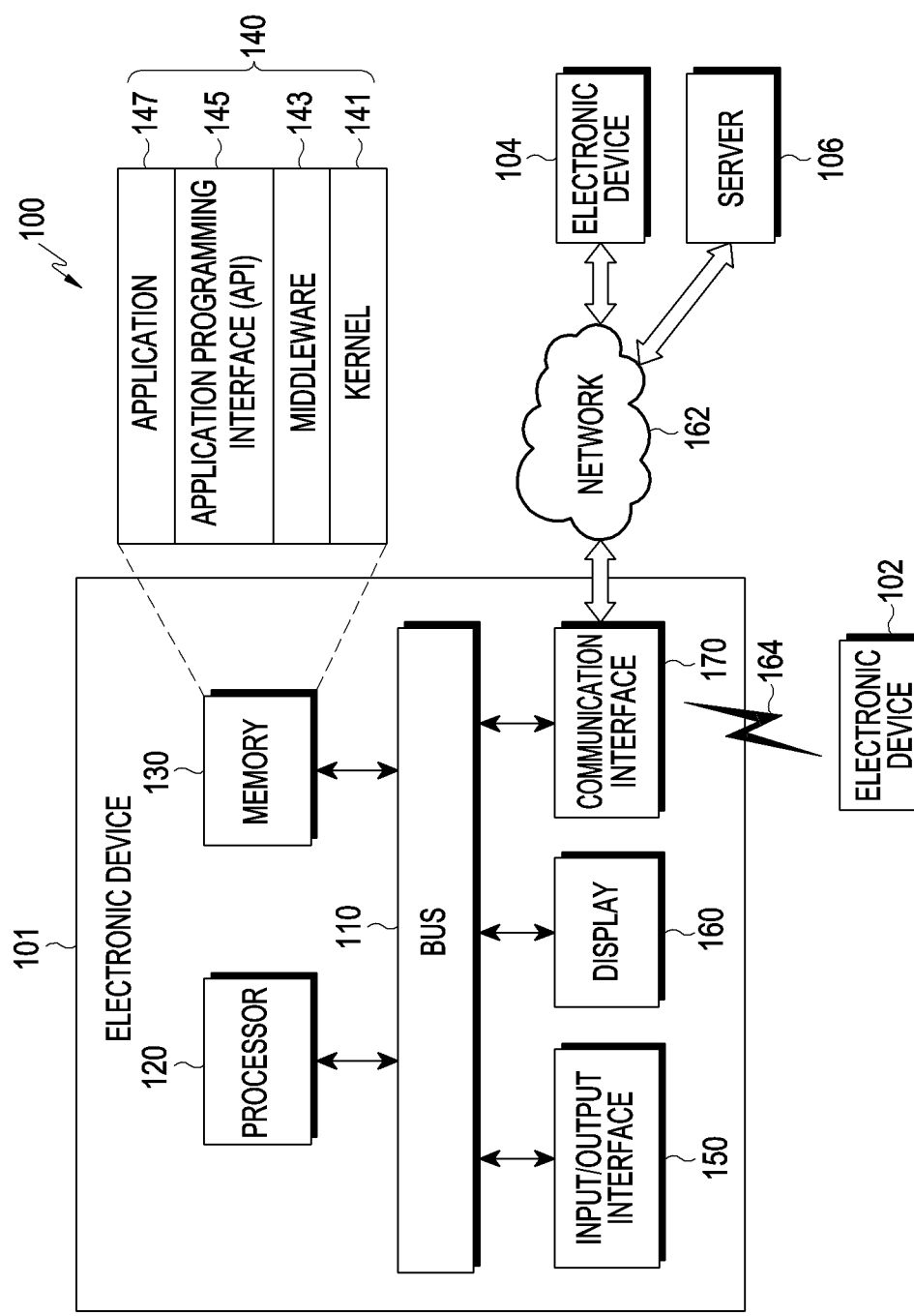
FIG. 1 is a block diagram illustrating a network environment including an electronic device according to various embodiments of the disclosure.

Hereinafter, various embodiments of the present disclosure will be described with reference to the accompanying drawings. The embodiments and the terms used therein are not intended to limit the technology disclosed herein to specific forms, and should be understood to include various modifications, equivalents, and/or alternatives to the corresponding embodiments. In describing the drawings, similar reference numerals may be used to designate similar constituent elements. A singular expression may include a plural expression unless they are definitely different in a context. As used herein, the expression "A or B" or "at least one of A and/or B" may include all possible combinations of items enumerated together. The expression "a first", "a second", "the first", or "the second" may modify various components regardless of the order and/or the importance, and is used merely to distinguish one element from any other element without limiting the corresponding elements. When an element (e.g., first element) is referred to as being "(functionally or communicatively) connected," or "directly coupled" to another element (second element), the element may be connected directly to the another element or connected to the another element through yet another element (e.g., third element).

The expression "configured to" as used in various embodiments of the present disclosure may be interchangeably used with, for example, "suitable for", "having the capacity to", "designed to", "adapted to", "made to", or "capable of" in terms of hardware or software, according to circumstances. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

An electronic device according to various embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device. According to various embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit). In some embodiments, the electronic device may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame.

In other embodiments, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an Automatic Teller's Machine (ATM) in banks, Point Of Sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.). According to some embodiments, an electronic device may include at least one of a part of furniture or a building/structure, an electronic board, an electronic signature receiving device, a projector, and various types of measuring instruments (e.g., a water meter, an electric meter, a gas meter, a radio wave meter, and the like). In various embodiments, the electronic device may be flexible, or may be a combination of one or more of the aforementioned various devices. The electronic device according to embodiments of the present disclosure is not limited to the above-described devices. In the present disclosure, the term "user" may indicate a person using an electronic device or a device (e.g., an artificial intelligence electronic device) using an electronic device.

Referring to FIG. 1, an electronic device 101 within a network environment 100 according to various embodiments will be described. The electronic device 101 may include a bus 110, a processor 120, a memory 130, an input/output interface 150, a display 160, and a communication interface 170. In some embodiments, the electronic device 101 may omit at least one of the elements, or may further include other elements. The bus 110 may include, for example, a circuit that interconnects the elements 110 to 170 and transmits communication (for example, control messages or data) between the elements. The processor 120 may include one or more of a central processing unit, an application processor, and a communication processor (CP). The processor 120, for example, may carry out operations or data processing relating to the control and/or communication of at least one other element of the electronic device 101.

The memory 130 may include volatile and/or non-volatile memory. The memory 130 may store, for example, instructions or data relevant to at least one other element of the electronic device 101. According to an embodiment, the memory 130 may store software and/or a program 140. The program 140 may include a kernel 141, middleware 143, an Application Programming Interface (API) 145, and/or application programs (or "applications") 147. At least some of the kernel 141, the middleware 143, and the API 145 may be referred to as an operating system. The kernel 141 may control or manage system resources (for example, the bus 110, the processor 120, or the memory 130) used for executing an operation or function implemented by other programs (for example, the middleware 143, the API 145, or the application 147). Furthermore, the kernel 141 may provide an interface through which the middleware 143, the API 145, or the application programs 147 may access the individual elements of the electronic device 101 to control or manage the system resources.

The middleware 143 may function as, for example, an intermediary for allowing the API 145 or the application programs 147 to communicate with the kernel 141 to exchange data. Furthermore, the middleware 143 may process one or more task requests, which are received from the application programs 147, according to priorities thereof. For example, the middleware 143 may assign priorities for using the system resources (for example, the bus 110, the processor 120, the memory 130, or the like) of the electronic device 101 to one or more of the application programs 147, and may process the one or more task requests. The API 145 is an interface through which the applications 147 control functions provided from the kernel 141 or the middleware 143, and may include, for example, at least one interface or function (for example, instruction) for file control, window control, image processing, or text control. For example, the input/output interface 150 may forward instructions or data, input from a user or an external device, to the other element(s) of the electronic device 101, or may output instructions or data, received from the other element(s) of the electronic device 101, to the user or the external device.

The display 160 may include, for example, a Liquid Crystal Display (LCD), a Light Emitting Diode (LED) display, an Organic Light Emitting Diode (OLED) display, a Micro Electro Mechanical System (MEMS) display, or an electronic paper display. The display 160 may display, for example, various types of content (for example, text, images, videos, icons, and/or symbols) for a user. The display 160 may include a touch screen and may receive, for example, a touch, gesture, proximity, or hovering input using an electronic pen or the user's body part. The communication interface 170 may establish, for example, communication between the electronic device 101 and an external device (for example, a first external electronic device 102, a second external electronic device 104, or a server 106). For example, the communication interface 170 may be connected to a network 162 through wireless or wired communication to communicate with the external device (for example, the second external electronic device 104 or the server 106).

The wireless communication may include, for example, a cellular communication that uses at least one of LTE, LTE-Advance (LTE-A), code division multiple access (CDMA), wideband CDMA (WCDMA), universal mobile telecommunications system (UMTS), wireless broadband (WiBro), global system for mobile communications (GSM), or the like. According to an embodiment, the wireless communication may include, for example, at least one of Wi-Fi (Wireless Fidelity), Bluetooth, Bluetooth low energy (BLE), ZigBee, near field communication (NFC), magnetic secure transmission, Radio Frequency (RF), and body area network (BAN). According to an embodiment, the wired communication may include GNSS. The GNSS may be, for example, a global positioning system (GPS), a global navigation satellite system (Glonass), a Beidou navigation satellite system (hereinafter, referred to as "Beidou"), or Galileo (the European global satellite-based navigation system). Hereinafter, in this document, the term "GPS" may be interchangeable with the term "GNSS". The wired communication may include, for example, at least one of a Universal Serial Bus (USB), a High Definition Multimedia Interface (HDMI), Recommended Standard 232 (RS-232), power line communication, a Plain Old Telephone Service (POTS), and the like. The network 162 may include a telecommunications network, for example, at least one of a computer network (for example, a LAN or a WAN), the Internet, and a telephone network.

Each of the first and second external electronic devices 102 and 104 may be of the same or a different type from the electronic device 101. According to various embodiments, all or some of the operations executed in the electronic device 101 may be executed in another electronic device or a plurality of electronic devices (for example, the electronic devices 102 and 104 or the server 106). According to an embodiment, when the electronic device 101 has to perform some functions or services automatically or in response to a request, the electronic device 101 may make a request for performing at least some functions relating thereto to another device (for example, the electronic device 102 or 104 or the server 106) instead of performing the functions or services by itself or in addition. Another electronic device (for example, the electronic device 102 or 104, or the server 106) may execute the requested functions or the additional functions, and may deliver a result thereof to the electronic device 101. The electronic device 101 may provide the received result as it is, or may additionally process the received result to provide the requested functions or services. To this end, for example, cloud computing, distributed computing, or client-server computing technology may be used.

Figure 2:
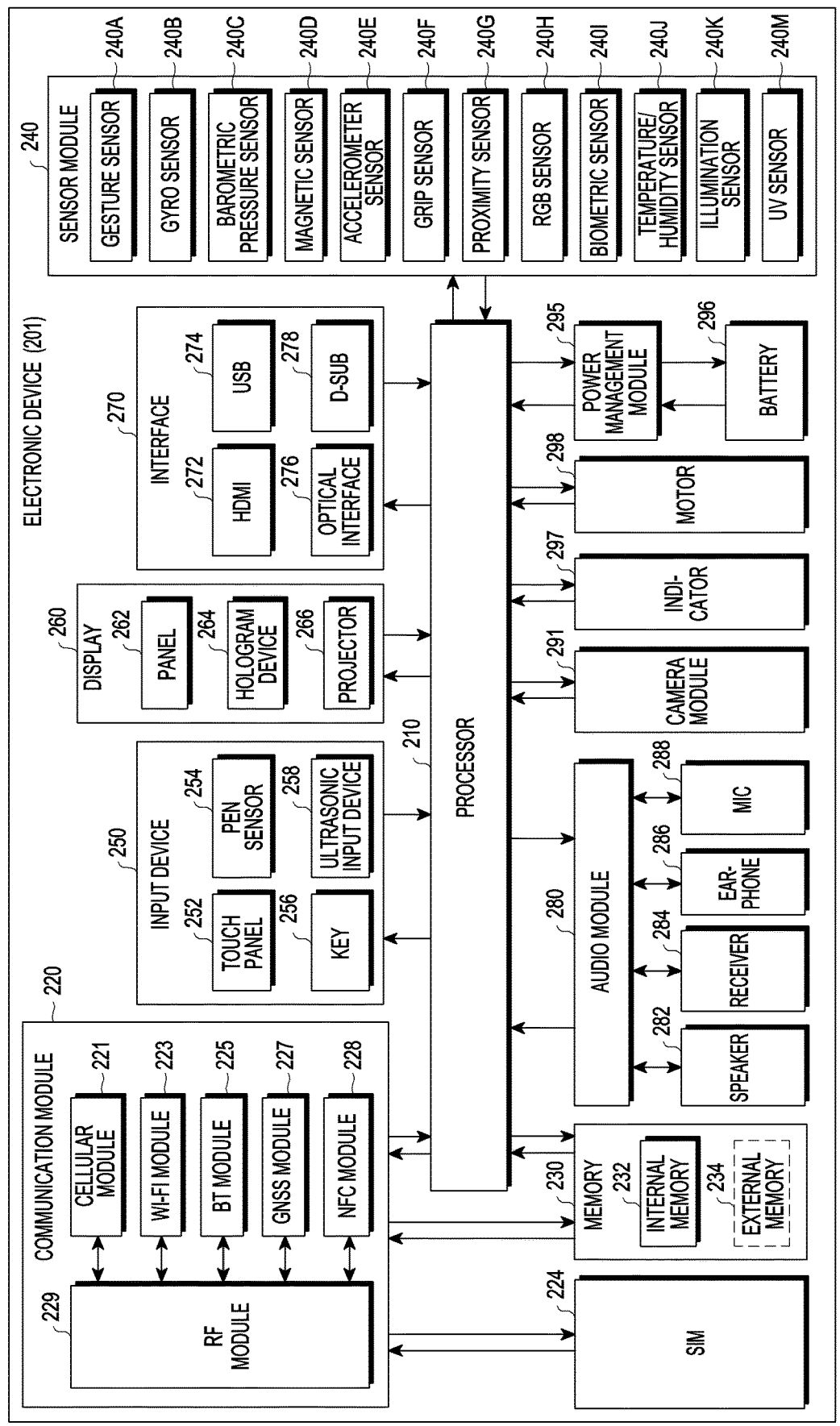
FIG. 2 is a block diagram illustrating an electronic device according to various embodiments.

FIG. 2 is a block diagram of the electronic device according to various embodiments;

The electronic device 201 may include, for example, the whole or part of the electronic device 101 illustrated in FIG. 1. The electronic device 201 may include at least one processor 210 (for example, an AP), a communication module 220, a subscriber identification module 224, a memory 230, a sensor module 240, an input device 250, a display 260, an interface 270, an audio module 280, a camera module 291, a power management module 295, a battery 296, an indicator 297, and a motor 298. The processor 210 may control a plurality of hardware or software elements connected thereto and may perform various data processing and operations by driving an operating system or an application program. The processor 210 may be implemented by, for example, a System on Chip (SoC). According to an embodiment, the processor 210 may further include a Graphic Processing Unit (GPU) and/or an image signal processor. The processor 210 may also include at least some of the elements illustrated in FIG. 2 (for example, a cellular module 221). The processor 210 may load, in volatile memory, instructions or data received from at least one of the other elements (for example, non-volatile memory), process the loaded instructions or data, and store the resultant data in the non-volatile memory.

The communication module 220 may have a configuration that is the same as, or similar to, that of the communication interface 170. The communication module 220 may include, for example, a cellular module 221, a Wi-Fi module 223, a Bluetooth module 225, a GNSS module 227, an NFC module 228, and an RF module 229. The cellular module 221 may provide, for example, a voice call, a video call, a text message service, an Internet service, or the like through a communication network. According to an embodiment, the cellular module 221 may identify and authenticate the electronic device 201 within a communication network using the subscriber identification module 224 (for example, a SIM card). According to an embodiment, the cellular module 221 may perform at least some of the functions that the processor 210 may provide. According to an embodiment, the cellular module 221 may include a Communication Processor (CP). According to some embodiments, at least some (for example, two or more) of the cellular module 221, the Wi-Fi module 223, the BT module 225, the GNSS module 227, and the NFC module 228 may be included in one Integrated Chip (IC) or IC package. The RF module 229 may transmit/receive, for example, a communication signal (for example, an RF signal). The RF module 229 may include, for example, a transceiver, a power amp module (PAM), a frequency filter, a low noise amplifier (LNA), an antenna, or the like. According to another embodiment, at least one of the cellular module 221, the Wi-Fi module 223, the BT module 225, the GPS module 227, and the NFC module 228 may transmit/receive an RF signal through a separate RF module. The subscriber identification module 224 may include, for example, a card that includes a subscriber identity module and/or an embedded SIM, and may contain unique identification information (for example, an Integrated Circuit Card Identifier (ICCID)) or subscriber information (for example, an International Mobile Subscriber Identity (IMSI)).

The memory 230 (for example, the memory 130) may include, for example, an internal memory 232 or an external memory 234. The internal memory 232 may include, for example, at least one of a volatile memory (for example, a DRAM, an SRAM, an SDRAM, or the like) and a non-volatile memory (for example, a One Time Programmable ROM (OTPROM), a PROM, an EPROM, an EEPROM, a mask ROM, a flash ROM, a flash memory, a hard disc drive, or a Solid State Drive (SSD)). The external memory 234 may include a flash drive, for example, a compact flash (CF), a secure digital (SD), a Micro-SD, a Mini-SD, an eXtreme digital (xD), a multi-media card (MMC), a memory stick, and the like. The external memory 234 may be functionally and/or physically connected to the electronic device 201 through various interfaces.

The sensor module 240 may, for example, measure a physical quantity or detect the operating state of the electronic device 201 and may convert the measured or detected information into an electrical signal. The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a color sensor 240H (for example, a red, green, blue (RGB) sensor), a biometric sensor 240I, a temperature/humidity sensor 240J, an illumination sensor 240K, and a ultraviolet (UV) sensor 240M. Additionally or alternatively, the sensor module 240 may include, for example, an e-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 240 may further include a control circuit for controlling one or more sensors included therein. In some embodiments, the electronic device 201 may further include a processor configured to control the sensor module 240 as a part of or separately from the AP 210, and may control the sensor module 240 while the AP 210 is in a sleep state.

The input device 250 may include, for example, a touch panel 252, a (digital) pen sensor 254, a key 256, or an ultrasonic input device 258. The touch panel 252 may use, for example, at least one of a capacitive type, a resistive type, an infrared type, and an ultrasonic type. Furthermore, the touch panel 252 may further include a control circuit. The touch panel 252 may further include a tactile layer to provide a tactile reaction to a user. The (digital) pen sensor 254 may include, for example, a recognition sheet that is a part of, or separate from, the touch panel. The key 256 may include, for example, a physical button, an optical key, or a keypad. The ultrasonic input device 258 may detect ultrasonic waves, which are generated by an input tool, through a microphone (for example, a microphone 288) to identify data corresponding to the detected ultrasonic waves.

The display 260 (for example, the display 160) may include a panel 262, a hologram device 264, a projector 266, and/or a control circuit for controlling them. The panel 262 may be implemented to be, for example, flexible, transparent, or wearable. The panel 262, together with the touch panel 252, may be configured as one or more modules. According to an embodiment, the panel 262 may include a pressure sensor (or a POS sensor) which may measure a strength of pressure of a user's touch. The pressure sensor may be implemented so as to be integrated with the touch panel 252 or may be implemented as one or more sensors separate from the touch panel 252. The hologram device 264 may show a three dimensional image in the air by using an interference of light. The projector 266 may display an image by projecting light onto a screen. The screen may be located, for example, in the interior of, or on the exterior of, the electronic device 201. The interface 270 may include, for example, an HDMI 272, a USB 274, an optical interface 276, or a D-subminiature (D-sub) 278. The interface 270 may be included in, for example, the communication circuit 170 illustrated in FIG. 1. Additionally or alternatively, the interface 270 may, for example, include a mobile high-definition link (MHL) interface, a secure digital (SD) card/multi-media card (MMC) interface, or an infrared data association (IrDA) standard interface.

The audio module 280 may convert, for example, sound into an electrical signal, and vice versa. At least some elements of the audio module 280 may be included, for example, in the input/output interface 145 illustrated in FIG. 1. The audio module 280 may process sound information that is input or output through, for example, a speaker 282, a receiver 284, earphones 286, the microphone 288, and the like. The camera module 291 is a device that can photograph a still image and a moving image. According to an embodiment, the camera module 291 may include one or more image sensors (for example, a front sensor or a rear sensor), a lens, an image signal processor (ISP), or a flash (for example, an LED or xenon lamp). The power management module 295 may manage, for example, the power of the electronic device 201. According to an embodiment, the power management module 295 may include a power management integrated circuit (PMIC), a charger IC, or a battery or fuel gauge. The PMIC may use a wired and/or wireless charging method. Examples of the wireless charging method may include a magnetic resonance method, a magnetic induction method, an electromagnetic wave method, and the like. Additional circuits (for example, a coil loop, a resonance circuit, a rectifier, and the like) for wireless charging may be further included. The battery gauge may measure, for example, the residual amount of the battery 296 and a voltage, current, or temperature while charging. The battery 296 may include, for example, a rechargeable battery and/or a solar battery.

The indicator 297 may display a particular state, for example, a booting state, a message state, a charging state, or the like of the electronic device 201 or a part (for example, the processor 210) of the electronic device 201. The motor 298 may convert an electrical signal into a mechanical vibration and may generate a vibration, a haptic effect, or the like. The electronic device 201 may include a mobile TV support device that can process media data according to a standard, such as digital multimedia broadcasting (DMB), digital video broadcasting (DVB), media- Flo™, and the like. Each of the above-described component elements of hardware according to the present disclosure may be configured with one or more components, and the names of the corresponding component elements may vary based on the type of electronic device. In various embodiments, an electronic device (for example, the electronic device 201) may omit some elements or may further include additional elements, or some of the elements of the electronic device may be combined with each other to configure one entity, in which case the electronic device may identically perform the functions of the corresponding elements prior to the combination.

Figure 3:
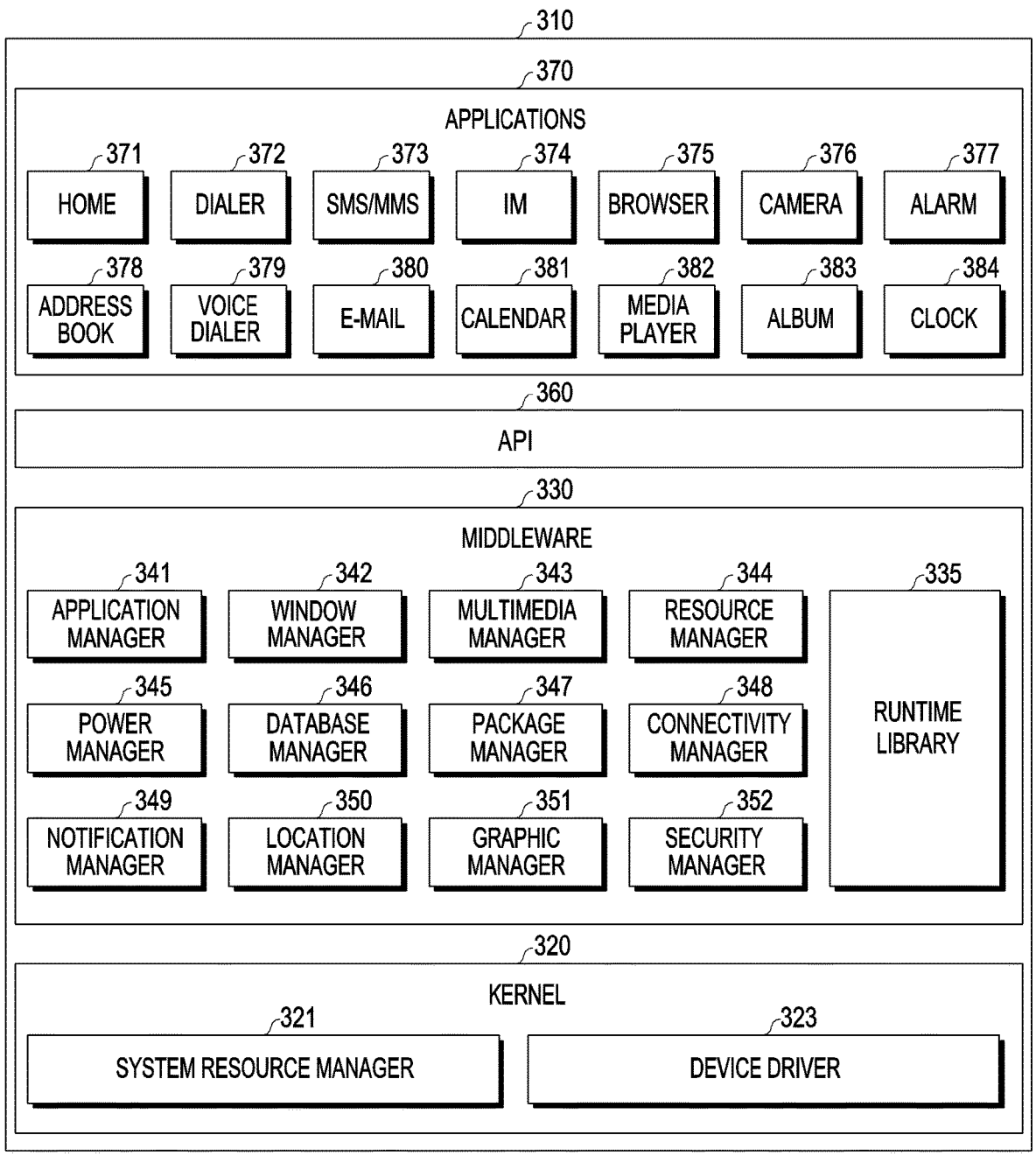
FIG. 3 is a block diagram illustrating a program module according to various embodiments.

FIG. 3 is a block diagram of a program module according to various embodiments.

According to an embodiment, the program module 310 (for example, the program 140) may include an Operating System (OS) that controls resources relating to an electronic device (for example, the electronic device 101) and/or various applications (for example, the application programs 217) that are driven on the operating system. The operating system may include, for example, Android™, iOS™, Windows™, Symbian™, Tizen™, or Bada™. Referring to FIG. 3, the program module 310 may include a kernel 320 (for example, the kernel 141), middleware 330 (for example, the middleware 143), an API 360 (for example, the API 145), and/or applications 370 (for example, the application programs 147). At least a part of the program module 310 may be preloaded on the electronic device, or may be downloaded from an external electronic device (for example, the electronic device 102 or 104 or the server 106).

The kernel 320 may include, for example, a system resource manager 321 and/or a device driver 323. The system resource manager 321 may control, allocate, or retrieve system resources. According to an embodiment, the system resource manager 321 may include a process manager, a memory manager, or a file system manager. The device driver 323 may include, for example, a display driver, a camera driver, a Bluetooth driver, a shared memory driver, a USB driver, a keypad driver, a Wi-Fi driver, an audio driver, or an inter-process communication (IPC) driver. The middleware 330 may provide, for example, a function required by the applications 370 in common, or may provide various functions to the applications 370 through the API 360 such that the applications 370 can efficiently use limited system resources within the electronic device. According to an embodiment, the middleware 330 may include at least one of a runtime library 335, an application manager 341, a window manager 342, a multi-media manager 343, a resource manager 344, a power manager 345, a database manager 346, a package manager 347, a connectivity manager 348, a notification manager 349, a location manager 350, a graphic manager 351, and a security manager 352.

The runtime library 335 may include, for example, a library module that a compiler uses in order to add a new function through a programming language while the applications 370 are being executed. The runtime library 335 may manage an input/output, manage a memory, or process an arithmetic function. The application manager 341 may manage, for example, the life cycles of the applications 370. The window manager 342 may manage GUI resources used for a screen. The multimedia manager 343 may identify formats required for reproducing various media files and may encode or decode a media file using a codec suitable for the corresponding format. The resource manager 344 may manage the source code of the applications 370 or the space in memory. The power manager 345 may manage, for example, the capacity or power of a battery and may provide power information required for operating the electronic device. According to an embodiment, the power manager 345 may operate in conjunction with a basic input/output system (BIOS). The database manager 346 may, for example, generate, search, or change databases to be used by the applications 370. The package manager 347 may manage the installation or update of an application that is distributed in the form of a package file.

The connectivity manager 348 may manage, for example, a wireless connection. The notification manager 349 may provide information on an event (for example, an arrival message, an appointment, a proximity notification, or the like) to a user. The location manager 350 may manage, for example, the location information of the electronic device. The graphic manager 351 may manage a graphic effect to be provided to a user and a user interface relating to the graphic effect. The security manager 352 may provide, for example, system security or user authentication. According to an embodiment, the middleware 330 may include a telephony manager for managing a voice or video call function of the electronic device or a middleware module that is capable of forming a combination of the functions of the above-described elements. According to an embodiment, the middleware 330 may provide specialized modules according to the types of operation systems. Furthermore, the middleware 330 may dynamically remove some of the existing elements, or may add new elements. The API 360 is, for example, a set of API programming functions, and may be provided with different configurations depending on the operating system. For example, in the case of Android or iOS, one API set may be provided for each platform, and in the case of Tizen, two or more API sets may be provided for each platform.

The applications 370 (e.g., the applications 147A) may include, for example, one or more applications that can perform functions, such as home 371, dialer 372, SMS/MMS 373, Instant Message (IM) 374, browser 375, camera 376, alarm 377, contacts 378, voice dial 379, e-mail 380, calendar 381, media player 382, album 383, clock 384, health care (e.g., measuring exercise quantity or blood sugar), providing environment information (e.g., providing atmospheric pressure, humidity, temperature information, etc.), and the like. According to an embodiment, the applications 370 may include an information exchange application that can support the exchange of information between the electronic device and an external electronic device. The information exchange application may include, for example, a notification relay application for relaying particular information to an external electronic device or a device management application for managing an external electronic device. For example, the notification relay application may relay notification information generated in the other applications of the electronic device to an external electronic device, or may receive notification information from an external electronic device to provide the received notification information to a user. The device management application may perform a function (for example, a function of turning on/off an external electronic device (or some elements thereof) or controlling brightness (or resolution) of the display) of the external electronic device communicating with the electronic device or install, delete, or update an application executed by the external electronic device. According to an embodiment, the applications 370 may include applications (for example, a health care application of a mobile medical appliance) that are designated according to the attributes of an external electronic device. According to an embodiment, the applications 370 may include applications received from an external electronic device. At least a part of the program module 310 may be implemented (for example, executed) by software, firmware, hardware (for example, the processor 210), or a combination of two or more thereof and may include a module, a program, a routine, an instruction set, or a process for performing one or more functions.

According to various embodiments, an electronic device may include: an earphone connector; an NFC antenna; a radio reception module; and a processor configured to electrically connect the radio reception module with the earphone connector or the NFC antenna depending on whether earphones are connected to the earphone connector.

According to one embodiment, the electronic device may further include a switch, wherein the processor may control the switch to electrically connect the radio reception module with the earphone connector or the NFC antenna depending on whether the earphones are connected to the earphone connector.

According to one embodiment, the NFC antenna may include a radiation unit including a plurality of loops.

According to one embodiment, the NFC antenna may include a plurality of radiation units, and each of the radiation units may include a plurality of loops.

According to one embodiment, the NFC antenna may include a plurality of radiation units, each of the radiation units may include a plurality of loops, and the plurality of radiation units may be arranged in a matrix form on the same plane.

According to one embodiment, the processor may determine whether the earphones are connected to the earphone connector when a radio application is executed in the electronic device.

According to one embodiment, the NFC antenna may receive a signal in a band ranging from 13 MHz to 109 MHz.

The radio signal may be an FM radio signal.

According to one embodiment, the electronic device may further include a low-noise amplifier configured to amplify a radio signal received through the NFC antenna.

According to one embodiment, the electronic device may further include a display, wherein the processor may control the display to display a screen for selecting a radio listening device.

According to one embodiment, the processor may control the radio reception module to be connected to the connector when earphones are selected on the screen for selecting the radio listening device, and may control the radio reception module to be connected to the NFC antenna when another device other than earphones is selected.

Figure 4A:
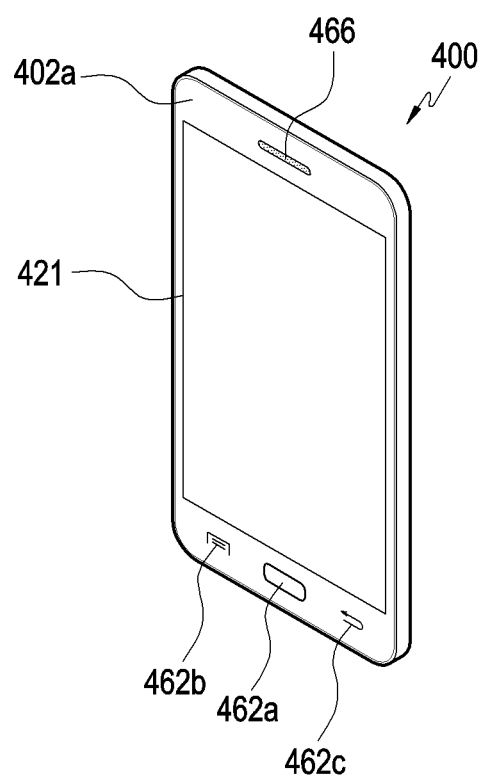
FIG. 4A is an external perspective view illustrating an electronic device according to various embodiments.
Figure 4B:
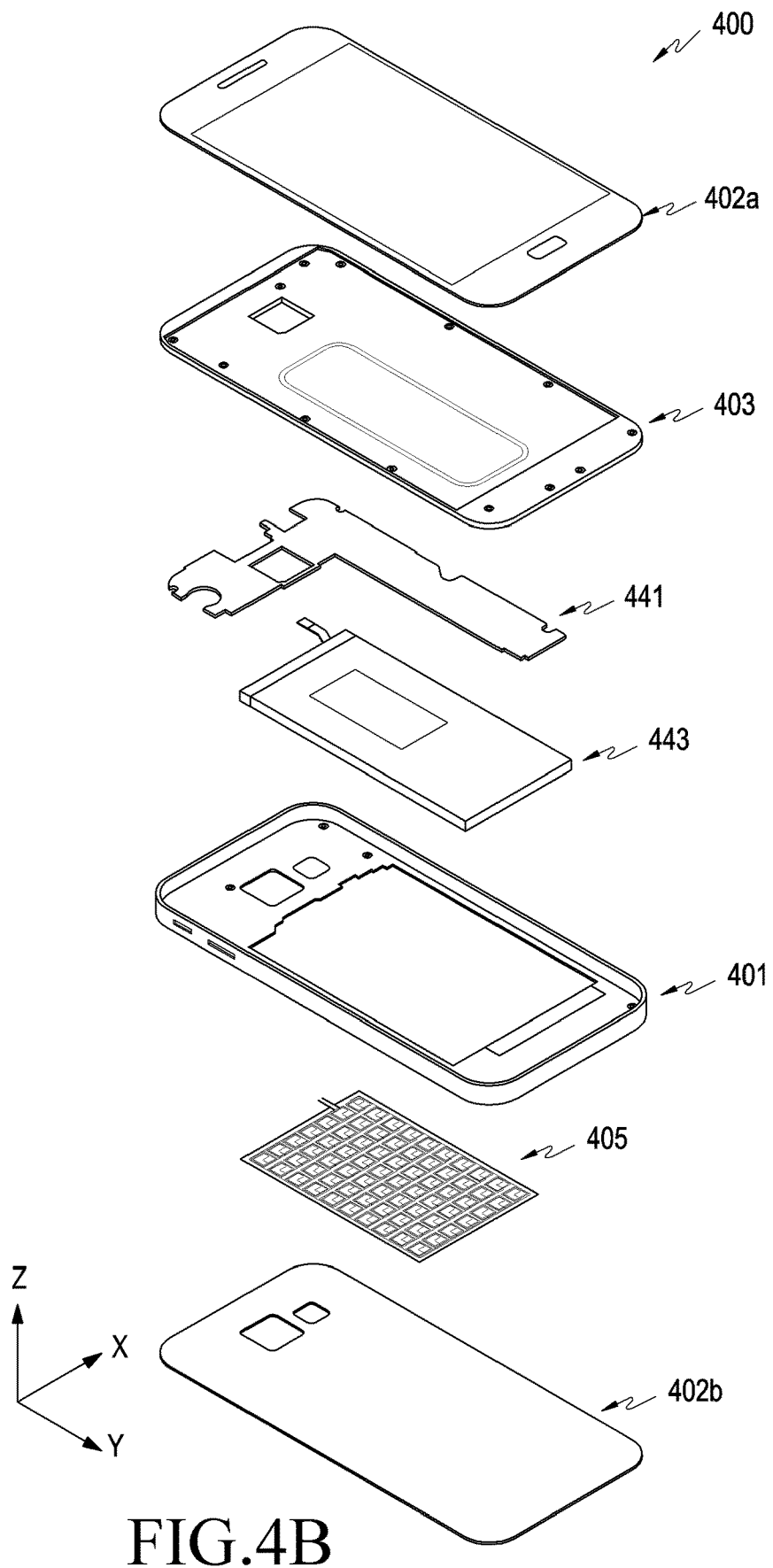
FIG. 4B is an exploded perspective view illustrating the electronic device according to one of the various embodiments.
Figure 4C:
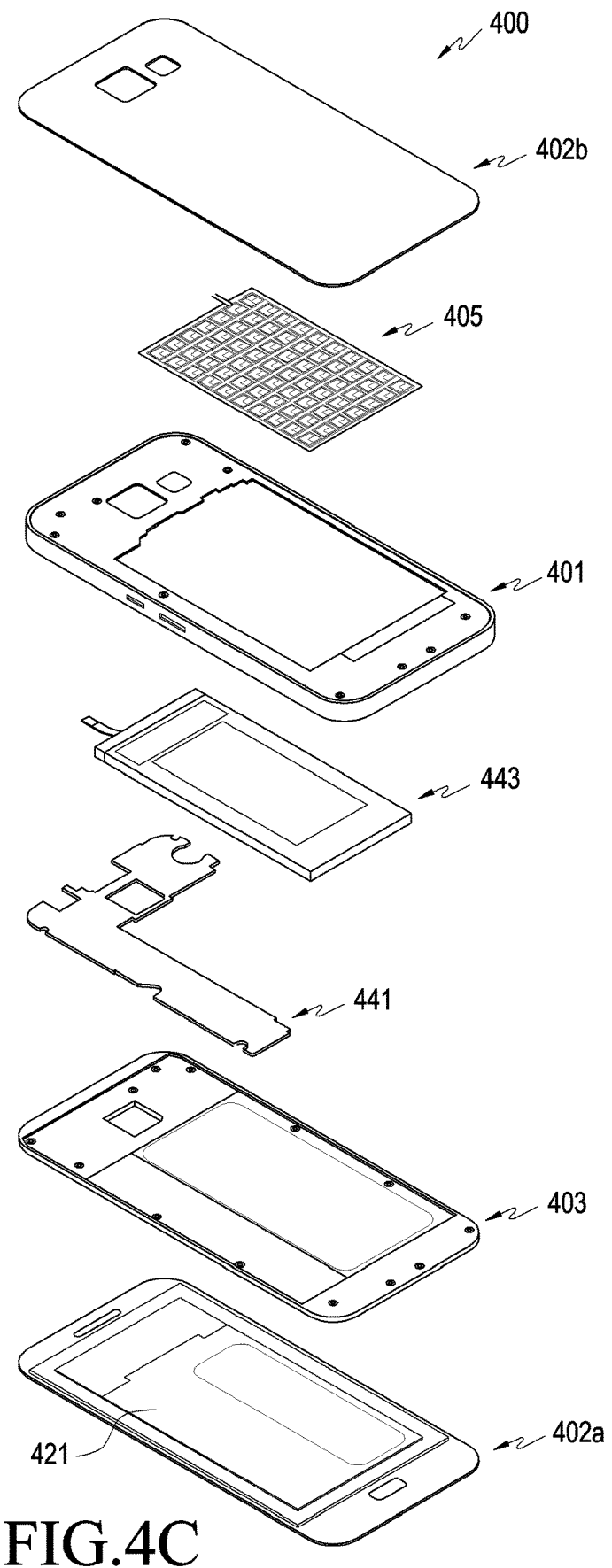
FIG. 4C is an exploded perspective view illustrating the electronic device viewed in a different direction according to one of the various embodiments.

FIG. 4A is an external perspective view illustrating an electronic device according to various embodiments. FIG. 4B is an exploded perspective view illustrating the electronic device according to one of the various embodiments. FIG. 4C is an exploded perspective view illustrating the electronic device viewed in a different direction according to one of the various embodiments. The electronic device 400 illustrated in FIGS. 4A to 4C may be the electronic device 101 in FIG. 1.

Referring to FIG. 4A, a touch screen, which is a display device 421, may be disposed at the center of a front surface 402a of a housing of the electronic device 400. The touch screen 421 may be formed to be large enough to occupy most of the front surface 402a. The touch screen 421 may display various screens. A home button 462a, a menu button 462b, and a back button 462c may be formed below the touch screen 421. The home button 462a may be provided to display a main home screen on the touch screen 470. For example, when the home key 462a is touched, the main home screen may be displayed on the touch screen 470. Also, when the home button 462a is touched while applications are running on the touch screen 421, the main home screen may be displayed on the touch screen 421. The menu button 462b is for providing a connect menu that can be used on the touch screen 421. The connect menu may include an add widget menu, a change wallpaper menu, a search menu, an edit menu, a configuration menu, and the like. The back button 462c may be for displaying a screen run immediately before a currently running screen or may be for terminating the most recently used application. A speaker 466 may be disposed in an upper portion of the front surface 402a of the electronic device 400.

Referring to FIGS. 4B and 4C, 'X' in a triaxial orthogonal coordinate system may denote a width direction of the electronic device 400, 'Y' may denote a length direction of the electronic device 400, and 'Z' may denote a thickness direction of the electronic device 400.

The electronic device 400 may include the housing 401, at least one plate 402a and 402b, a conductive pattern unit 405, and a communication module (e.g., an NFC communication module 610) or an FM reception module 620) connected to the conductive pattern unit 405.

According to various embodiments, the housing 401 is for accommodating various electronic components, and at least a portion of the housing 401 may be made of a conductive material. For example, the housing 401 may include sidewalls forming an external lateral surface of the electronic device 400, and an externally exposed portion of the electronic device 400 may be made of a conductive metallic material. A circuit board 441 and/or a battery 443 may be accommodated in the housing 401. For example, a processor (e.g., the processor 201 of FIG. 2), a communication module (e.g., the communication module 220 of FIG. 2), various interfaces (e.g., the interface 270 of FIG. 2), a power management module (e.g., the power management module 295 of FIG. 2), and the like may be mounted on the circuit board 441 in the form of an integrated circuit chip, and the communication module (e.g., the NFC communication module 610 or the FM reception module 620) may also be configured as an integrated circuit chip and be mounted on the circuit board 441.

According to various embodiments, the plate 402a and 402b may be at least partially made of a material that penetrates radio waves or a magnetic field and may include a front cover 402a mounted on the front of the housing 401 and a rear cover 402b mounted on the rear of the housing 401. The front cover 402a may include, for example, the display device 421. For example, the front cover 402a may include a window member made of a tempered glass material and the display device 421 mounted on an internal surface of the window member. A touch panel may be disposed between the window member and the display device 421. For example, the front cover 402a may be used as both an output device for outputting a screen and an input device having a touch screen function. The rear cover 402b may be mounted to face the front cover 402a and may be made of a material penetrating radio waves or a magnetic field, for example, tempered glass or synthetic resins. The plate, for example, the front cover 402a and the rear cover 402b, may be mounted on the housing 401 to form the appearance of the electronic device 400 along with the housing 401.

According to various embodiments, a support member 403 may be mounted in the housing 401. The support member 403 may be made of a metallic material and may be disposed in a space formed by the housing 401 and the front cover 402a. For example, the support member 403 may be interposed between the display device 421 and the circuit board 441. The support member 403 can prevent the integrated circuit chips mounted on the circuit board 441 from coming in contact with the display device 421 and may provide an electromagnetic shielding function to prevent electromagnetic interference between the integrated circuit chips. The support member 403 can complement the strength of the electronic device 400. For example, the housing 401 may be formed with a plurality of openings or recessed portions depending on the arrangement of the electronic components inside the electronic device 400, which may reduce the strength. The support member 403 may be mounted in and fastened to the housing 401, thereby improving the strength of the housing 401 or the electronic device 400.

According to various embodiments, although not shown in detail in the drawing, various structures may be formed on the surface of the housing 401 and the support member 403 depending on the arrangement of the electronic components disposed inside the electronic device 400 or the coupling structure of the housing 401 and the support member 403. For example, a space for accommodating the integrated circuit chips mounted on the circuit board 441 may be formed in each of the housing 401 and/or the support member 403. The space for accommodating the integrated circuit chips may be formed in a recessed shape or in a rib surrounding the integrated circuit chips. According to various embodiments, fastening bosses and fastening holes, which are correspond to each other, may be formed on the housing 401 and the support member 403. For example, the housing 401 and the support member 403 may be fastened to each other, with the housing 401 and the support member 403 facing each other or the support member 403 being accommodated in the housing 401, by fastening a fastening member, such as a screw, to a fastening member or a fastening hole.

According to various embodiments, the conductive pattern unit 405 may be mounted on a surface of the housing 401 to face the circuit board 441. For example, the conductive pattern unit 405 may be located in a space formed by the rear cover 402b and the housing 401. The conductive pattern unit 405 may include at least one conductive pattern, for example, a planar coil, through which radio waves may be transmitted or received or a magnetic field may be generated. The conductive pattern unit 405 will be described in more detail with reference to FIGS. 5A, 5B, 5C, and 5D according to various embodiments of the disclosure.

According to various embodiments, radio waves transmitted or received through the conductive pattern unit 405 or a magnetic field generated by the conductive pattern unit 405 may penetrate the plate, for example, the rear cover 402b. For example, the rear cover 402b may be made of a tempered glass material or a synthetic resin material. When the rear cover 402b is made of a transparent material, such as tempered glass, a coating layer may be formed on an inner or outer surface of the rear cover 402b, thereby covering a structure or an electronic component (e.g., the conductive pattern unit 405) inside the rear cover 402b.

According to various embodiments, the conductive pattern unit 405 may be an NFC antenna. According to various embodiments, the NFC antenna may include a radiating unit including a plurality of loops. According to various embodiments, the NFC antenna may include a plurality of radiation units, each of which may include a plurality of loops. According to various embodiments, the NFC antenna may include a plurality of radiation units, each radiation unit may include a plurality of loops, and the plurality of radiation units may be arranged in a matrix on the same plane.

FIGS. 5A to 5D are plan views illustrating an NFC antenna of an electronic device that is installed in a housing according to various embodiments. The NFC antenna in FIGS. 5A to 5D may correspond to the conductive pattern unit 405 in FIGS. 4B and 4C. According to one embodiment, the housing in FIGS. 5A to 5D may correspond to the housing 401 in FIGS. 4B and 4C.

Referring to FIGS. 5A to 5D, the NFC antenna 505 may include a base member 551 and any one of first to fourth NFC antenna patterns 553a, 553b, 553c, and 553d.

Figure 5A:
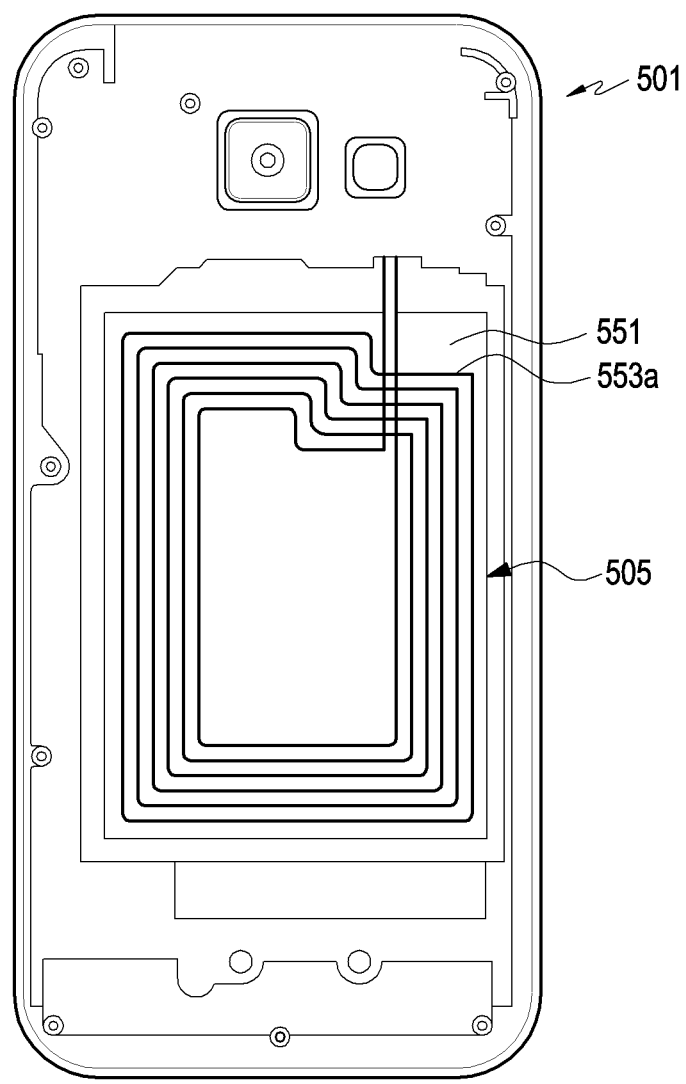
FIGS. 5A to 5D are plan views illustrating a conductive pattern unit of an electronic device that is installed in a housing according to various embodiments.
Figure 5B:
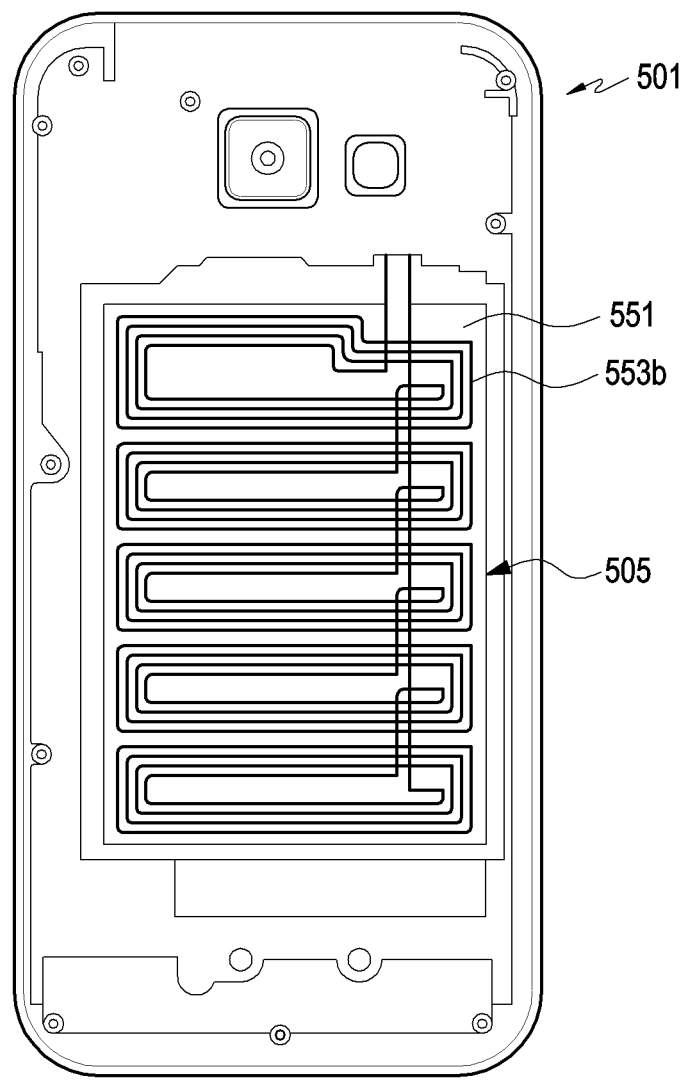
Figure 5C:
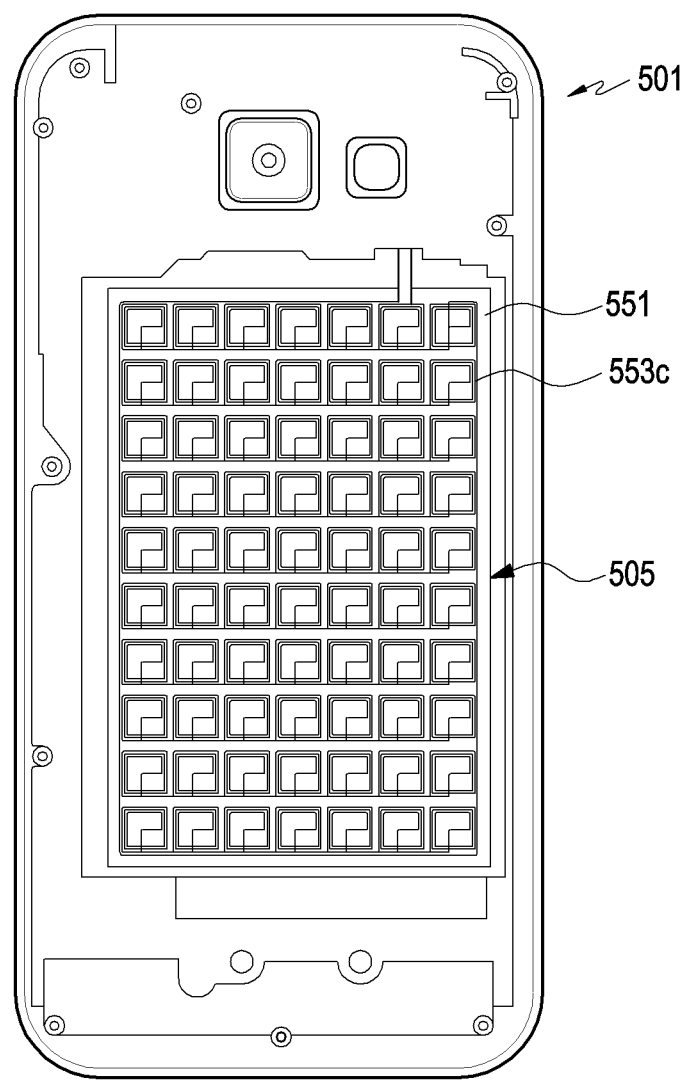
Figure 5D:
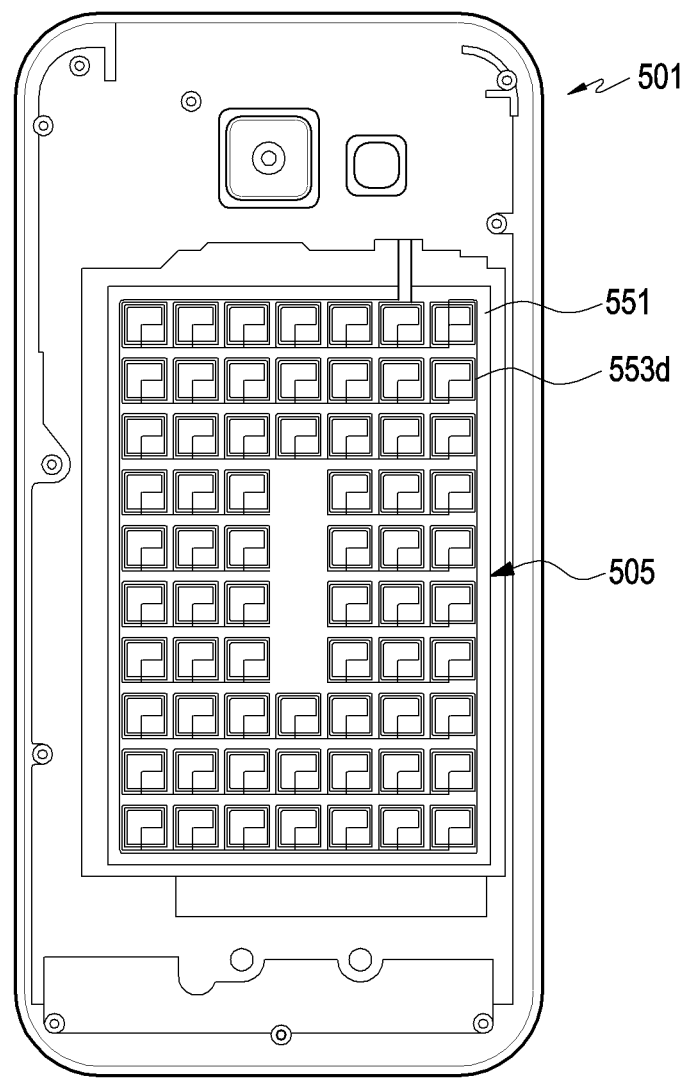

Referring to FIG. 5A, the first NFC antenna pattern 553a may include a radiation unit including a plurality of loops. Referring to FIG. 5B, the second NFC antenna pattern 553b may include a plurality of radiation units, and each radiation unit may include a radiation unit including a plurality of loops. Referring to FIG. 5C, the third NFC antenna pattern 553c may include a plurality of radiation units, each radiation unit may include a plurality of loops, and the plurality of radiation units may be arranged in a matrix on the same plane. Referring to FIG. 5D, the fourth antenna pattern 553d may include a plurality of radiation units, each radiation unit may include a plurality of loops, the plurality of radiation units may be arranged in a matrix on the same plane, and a plurality of radiation units may not be arranged in a portion of the matrix.

Referring to FIGS. 5A to 5D, the base member 551 may include a film made of an insulator or a dielectric material and may provide an area for forming any one of the first to fourth NFC antenna patterns 553a, 553b, 553c, and 553d. For example, the NFC antenna 505 may have the appearance of a flexible printed circuit board. Alternatively, the NFC antenna 505 may be a flexible printed circuit board, which may have a multi-layer circuit board structure. For example, any one of the first to fourth NFC antenna patterns 553a, 553b, 553c, and 553d may individually be disposed on one side or the other side of the base member 551.

According to one embodiment, any one of the first to fourth NFC antenna patterns 553a, 553b, 553c, and 553d may individually include a loop antenna, wherein if the loop antenna is a flexible printed circuit board, a plurality of communication loop antennas may be included in one flexible printed circuit board. According to one embodiment, an antenna formed of one flexible printed circuit board may include a loop antenna for NFC communication and FM signal reception. For example, in an electronic device where both the front and the rear are glass, a flexible printed circuit board antenna may be located between the rear glass and an inner housing (e.g., the housing 501) of the terminal. For example, at least a portion of the inner housing may include a nonconductive material (e.g., injected plastic). For example, at least a portion of the inner housing may include an opening. At least a portion of the flexible printed circuit board antenna may overlap a battery inside the terminal.

According to one embodiment, the loop antenna for NFC communication and FM signal reception may include a conductive line wound a plurality of times.

According to one embodiment, the flexible printed circuit board antenna may further include a heat-radiating sheet (e.g., a graphite sheet) and a shielding agent (e.g., ferrite).

According to various embodiments, the base member 551 may include a connecting piece (not shown). The connecting piece may provide a tool that connects any one of the first to fourth NFC antenna patterns 553a, 553b, 553c, and 553d to a control circuit or communication module of the electronic device (e.g., the electronic devices 101, 201, and 400 illustrated in FIGS. 1, 2, and/or 4A). For example, one end portion of any one of the first to fourth NFC antenna patterns 553*a*, 553*b*, 553*c*, and 553*d* may be positioned on the connecting piece and may be connected to the control circuit or communication module via a connection member, such as a connector, a pogo pin, and a C-clip.

According to various embodiments, any one of the first to fourth NFC antenna patterns 553*a*, 553*b*, 553*c*, and 553*d* may include a plurality of turns of a conductive line wound in a circular or polygonal shape, and may be disposed substantially in parallel to a housing 501 or a plate (e.g., a rear cover 502*a*) when the base member 551 is mounted on the housing 501. Any one of the first to fourth NFC antenna patterns 553*a*, 553*b*, 553*c*, and 553*d* may be connected to the communication module (e.g., the NFC communication module 610 or the FM reception module 620 in FIG. 6) to transmit and receive radio waves or power or to generate a magnetic field.

Referring to FIGS. 5A to 5D, each of the first to fourth NFC antennas 553*a*, 553*b*, 553*c*, and 553*d* may receive a signal in a frequency band ranging from 13 MHz to 109 MHz and may be formed to include a plurality of turns of a conductive line that is wound into a loop form in a circle, a polygon, or a combination of a curve and a straight line.

Each of the first to fourth NFC antennas 553*a*, 553*b*, 553, and 553*d* may transmit and receive NFC signals in a band of 13.56 MHz, may receive FM radio signals in a band ranging from 87.5 MHz to 108 MHz, or may generate a magnetic field.

Further, a matching circuit, a lumped element, and/or a switch element may be disposed on a line connecting the communication module and each of the first to fourth NFC antennas 553*a*, 553*b*, 553*c*, and 553*d*, thereby adjusting the resonance frequency or the magnetic flux distribution of each conductive pattern. For example, when the communication module includes an FM radio reception module and an NFC module, each of the first to fourth NFC antennas 553*a*, 553*b*, 553*c*, and 553*d* may be connected to one of the radio reception module and the NFC module using the switch element, thereby enabling each of the first to fourth NFC antennas 553*a*, 553*b*, 553*c*, and 553*d* to perform one of an FM radio reception function and an NFC communication function.

Figure 6:
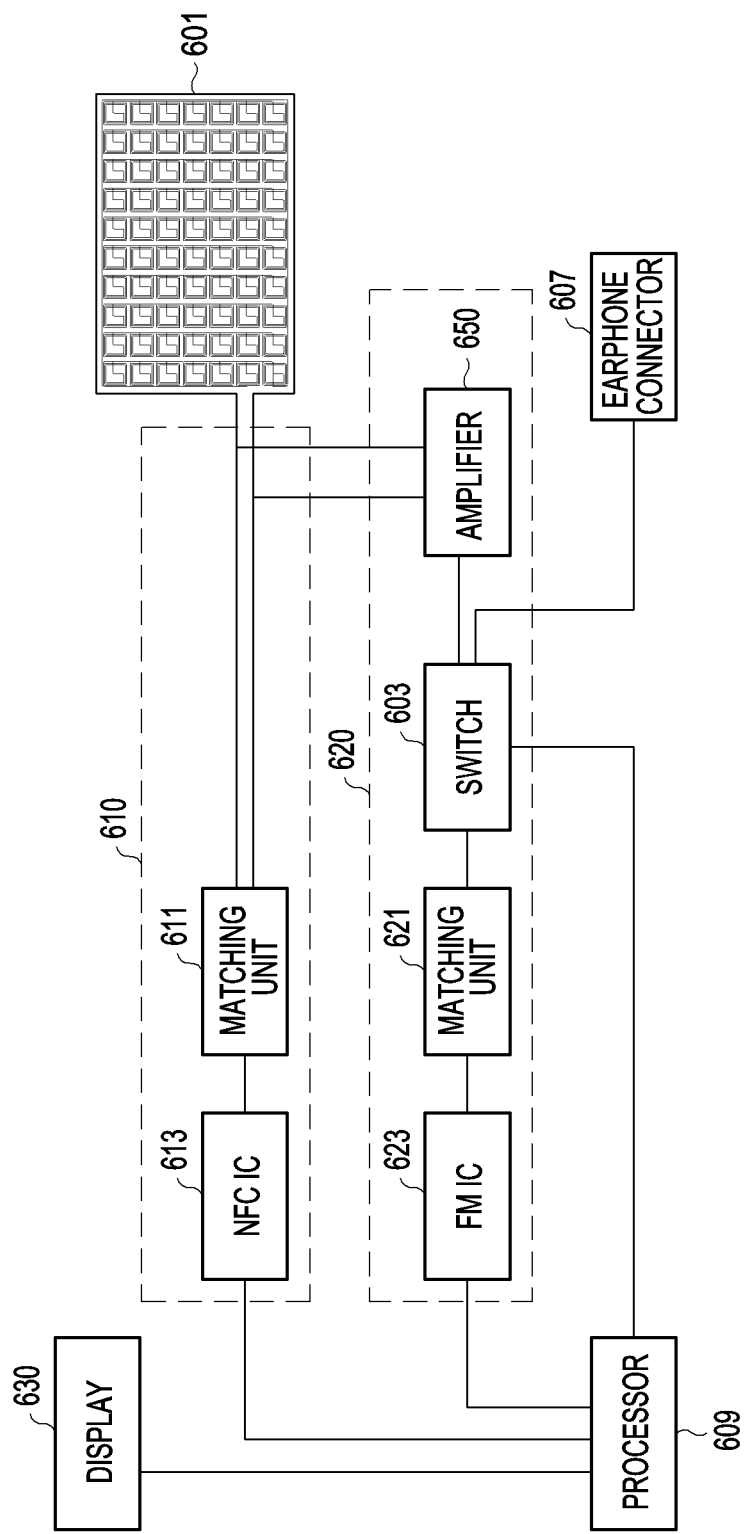
FIG. 6 illustrates a configuration for FM radio reception in an electronic device according to various embodiments.

FIG. 6 illustrates a configuration for FM radio reception in an electronic device according to various embodiments.

Referring to FIG. 6, the electronic device 600 may include an NFC antenna 601, an NFC communication module 610, an FM radio reception module 620, a switch 603, an amplifier 605, an earphone connector 607, a processor 609, and a display 630.

The NFC antenna 601 may include conductive lines capable of receiving a signal in a frequency band ranging from 13 MHz to 109 MHz and may be formed into the shape of one closed loop of a plurality of turns or the shape of a plurality of closed loops of a plurality of turns. According to various embodiments, the NFC antenna 601 may be formed in the shape of a matrix of a plurality of loops. According to various embodiments, the NFC antenna 601 can receive signals in a frequency band ranging from 13 MHz to 109 MHz, can transmit and receive NFC signals in a band of 13.56 MHz, can receive FM radio signals in a band ranging from 87.5 MHz to 108 MHz, or can generate a magnetic field.

The NFC communication module 610 may include a matching unit 611 and an NFC Integrated Chip (IC) 613. The matching unit 611 may be connected to the NFC antenna 601 and the NFC IC 613. The matching unit 611 may match the impedance of the NFC antenna 601 and the impedance of the NFC IC 613, thereby reducing signal loss and improving NFC signal transmission characteristics. Improved signal transmission characteristics may improve communication quality. That is, the matching unit 611 may match the impedance of the NFC antenna 601 with the impedance of the NFC IC 613, thereby enabling transmission and reception of radio-frequency signals in an NFC-frequency band. The NFC IC 613 may receive and process a reception signal in the NFC-frequency band, received through the matching unit 611, and may process a transmission signal in the NFC-frequency band to be transmitted.

The FM radio reception module 620 may include a matching unit 621 and an FM IC 623. The matching unit 621 may match the impedance of the amplifier 605, connected thereto via the switch 603, and the NFC antenna 601 and the impedance of the FM IC 623, thereby enabling reception of radio-frequency signals in an FM-frequency band through the NFC antenna 601. Further, the matching unit 621 may match the impedance of the earphone connector 607 connected through the switch 603 and the impedance of the FM IC 623, thereby enabling reception of radio-frequency signals in the FM-frequency band through the earphone connector 640. The FM IC 623 may receive and process a reception signal in the FM-frequency band received through the matching unit 621.

The switch 603 may perform switching under the control of the processor 609. According to various embodiments, the switch 603 may perform switching such that the FM reception module 620 is connected to the NFC antenna 601 or may perform switching such that the FM reception module 620 is connected to the earphone connector 607.

The amplifier 605 may be a Low-Noise Amplifier (LNA). The amplifier 605 may be connected to the switch 603 and the NFC antenna 601 and may amplify an FM radio signal received via the NFC antenna 601.

The earphone connector 607 may be connected to earphones that serve as an antenna and may receive an FM radio signal through the earphones. The earphone connector 607 may be connected to the FM reception module 620 via the switch 603, and may transmit the FM radio signal to the FM reception module 620 when connected to the FM reception module 620.

The processor 609 may control the switch 603 depending on whether earphones are connected to the earphone connector 607. According to various embodiments, the processor 609 may control the switch 603 to connect the FM reception module 620 with the earphone connector 607 when the earphones are connected to the earphone connector 607. The processor 609 may control the switch 603 to connect the FM reception module 620 with the NFC antenna 601 through the amplifier 605 when the earphones are not connected to the earphone connector 607. According to various embodiments, the processor 609 may control the display 630 to display a radio listening device selection screen when a radio application is executed. When earphones are selected as a radio listening device, the processor 609 may control the switch 603 to connect the FM reception module 620 with the earphone connector 607. When a device other than earphones, for example, one of a speaker and a wireless headset, is selected, the processor 609 may control the switch 603 to connect the FM reception module 620 with the NFC antenna 601 through the amplifier 605.

The display 630 may display a radio application execution screen under the control of the processor 609 and may display the radio listening device selection screen. A selectable radio listening device may be displayed on the radio listening device selection screen. According to various embodiments, the radio listening device may include earphones, a speaker, and a wireless headset, and a user may select one of the earphones, the speaker, and the wireless headset.

According to various embodiments, a method for receiving a radio signal in an electronic device may include: determining whether earphones are connected to an earphone connector when a radio application is executed; and electrically connecting a radio reception module with the earphone connector or an NFC antenna depending on whether the earphones are connected to the earphone connector.

According to one embodiment, the NFC antenna may receive a signal in a band ranging from 13 MHz to 109 MHz.

According to one embodiment, the radio signal may be an FM radio signal.

According to one embodiment, the method may further include displaying a screen for selecting a radio listening device.

According to one embodiment, the method may further include connecting the radio reception module to the earphone connector when earphones are selected on the screen for selecting the radio listening device and connecting the radio reception module to the NFC antenna when another device other than earphones is selected.

Figure 7:
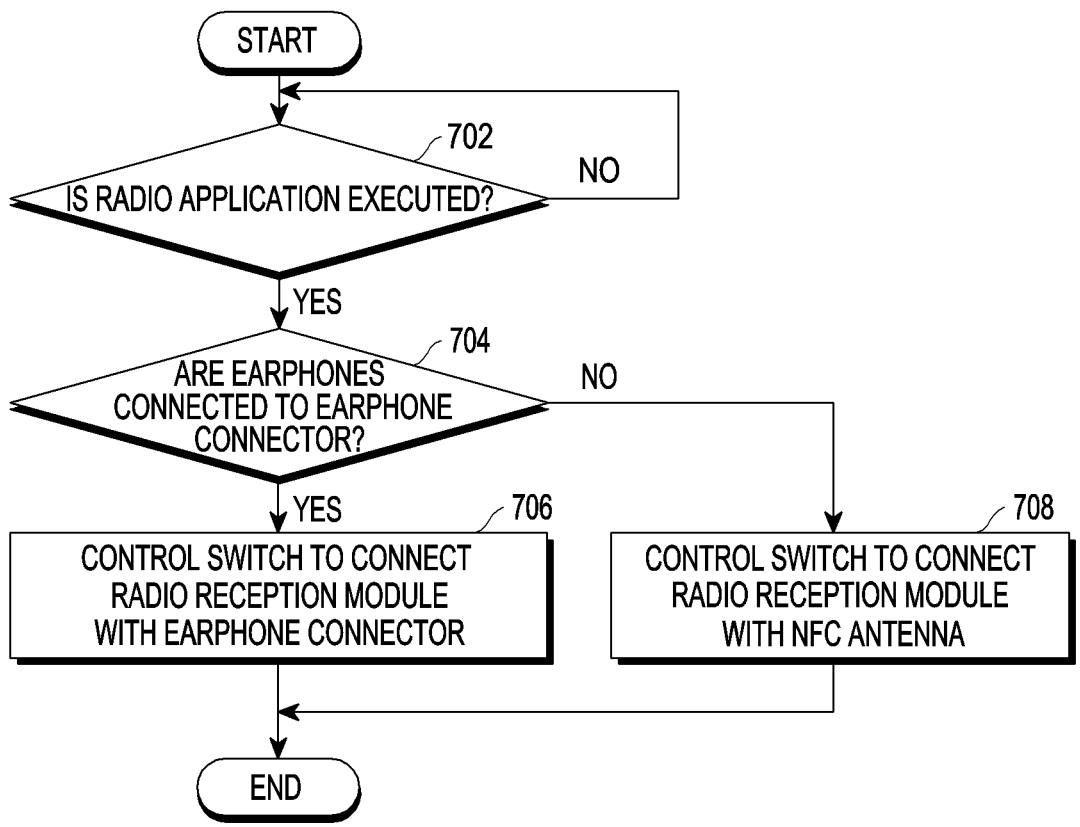
FIG. 7 is a flowchart illustrating an FM radio reception operation of an electronic device according to various embodiments.

FIG. 7 is a flowchart illustrating an FM radio reception operation of an electronic device according to various embodiments. Referring to FIG. 7, in operation 702, the electronic device may determine whether a radio application is executed.

When the radio application is executed, the electronic device may determine whether earphones are connected to an earphone connector in operation 704.

When the earphones are connected to the earphone connector, the electronic device may control a switch to connect a radio reception module with the earphone connector in operation 706.

When the earphones are not connected to the earphone connector, the electronic device may control the switch to connect the radio reception module with an NFC antenna in operation 708.

As described above, even when a user receives the radio via an NFC antenna capable of NFC communication instead of earphones, a radio sound condition perceived by the user may be good.

FIG. 8 is a table illustrating sound assessment standards according to various embodiments. Referring to FIG. 8, the sound assessment standards may be divided into good, fair, and poor. A sound condition of good may indicate a noise-free state. A sound condition of fair may indicate a state in which there is noise but there is no problem in listening. A state in which there is no problem in listening may indicate a state in which a user can perceive a radio signal. A sound condition of poor may indicate a state in which there is noise and there is a problem in listening. A state in which there is a problem in listening may be a state in which the user cannot perceive a radio signal.

FIG. 9 is a table illustrating the results of a sound test in a strong electric field according to various embodiments. FIG. 9 shows the number of channels per sound where an FM radio signal is received using earphones and an NFC antenna in the strong electric field.

As a result of the sound test, when there are 19 channels with a good sound condition via the earphones, there are 17 channels with a good sound condition via the NFC antenna. When there are 10 channels with a fair sound condition via the earphones, there are 5 channels with a fair sound condition via the NFC antenna. When there are 4 channels with a poor sound condition via the earphones, there are 11 channels with a poor sound condition via the NFC antenna. That is, the number of channels enabling listening through the earphones and the NFC antenna is the same 33. Further, when a channel with a good sound condition is set as a valid channel, there are 19 valid listening channels via the earphones and 17 valid listening channels via the NFC antenna. That is, the difference between the channels enabling listening via the earphones and the channels enabling listening via the NFC antenna is merely two, which is not a significant difference. Therefore, when a radio signal is received through the NFC antenna in the strong electric field according to an embodiment of the disclosure, radio signal reception quality is not remarkably reduced as compared to when a radio signal is received through the earphones.

FIG. 10 is a table illustrating the results of a sound test in a weak electric field according to various embodiments. FIG. 10 shows the number of channels per sound where an FM radio signal is received using earphones and an NFC antenna in the weak electric field.

When there are 11 channels with a good sound condition via the earphones, there are 8 channels with a good sound condition via the NFC antenna. When there are 2 channels with a fair sound condition via the earphones, there are 2 channels with a fair sound condition via the NFC antenna. When there is no channel with a poor sound condition via the earphones, there are 4 channels with a poor sound condition via the NFC antenna. That is, there are 13 channels enabling listening through the earphones and 11 channels enabling listening through the NFC antenna. When a channel with a good sound condition is set as a valid channel, there are 11 valid listening channels via the earphones and 8 valid listening channels via the NFC antenna. The difference between the channels enabling listening via the earphones and the channels enabling listening via the NFC antenna is merely two, and the difference in the number of valid listening channels therebetween is merely three. That is, the difference in the number of channels enabling listening and the difference in the number of valid listening channels are not significant. Therefore, when a radio signal is received through the NFC antenna in the weak electric field according to an embodiment of the disclosure, radio signal reception quality is not remarkably reduced as compared to when a radio signal is received through the earphones.

Figure 11:
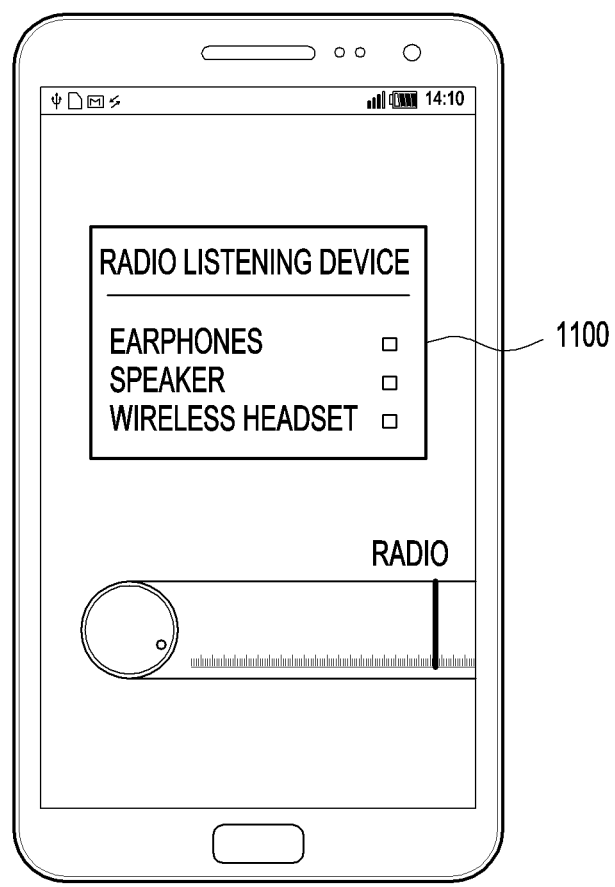
FIG. 11 illustrates an example of a radio listening device selection screen according to various embodiments.

FIG. 11 illustrates an example of a radio listening device selection screen according to various embodiments. Referring to FIG. 11, a selectable radio listening device 1100 may be displayed on the radio listening device selection screen. According to various embodiments, the radio listening device may include earphones, a speaker, and a wireless headset, and a check box may be displayed to select a radio listening device. The display 630 may receive any one device selected by the user through the check box from among the earphones, the speaker, and the wireless headset.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. The instruction, when executed by a processor (e.g., the processor 120), may cause the one or more processors to execute the function corresponding to the instruction. The computer-readable storage medium may be, for example, the memory 130.

According to various embodiment, a storage medium may store a radio reception program, wherein the program may perform, in an electronic device: an operation of determining whether earphones are connected to an earphone connector when a radio application is executed; and an operation of electrically connecting a radio reception module with the earphone connector or an NFC antenna depending on whether the earphones are connected to the earphone connector.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

The programming module according to the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Furthermore, some operations may be executed in a different order or may be omitted, or other operations may be added.

While the present disclosure has been shown and described with reference to certain embodiments thereof, it will be apparent to those skilled in the art that the camera lens module according to the present disclosure is not limited to these embodiments, and various changes in form and details may be made therein without departing from the spirit and scope of the present disclosure as defined by the appended claims.

What is claimed is:

1. An electronic device comprising:
    a display;
    an earphone connector;
    a Near-Field Communication (NFC) antenna;
    a radio receiver configured to receive an FM radio signal;
    a switch configured to electrically connect the radio receiver to either the NFC antenna or the earphone connector; and
    a processor configured to:
        control the display to display a listening device selection screen for selecting a listening device among a plurality of listening devices,
        control the switch to electrically connect the radio receiver to the earphone connector if a first listening device is selected among the plurality of listening devices when a radio application is executed, and
        control the switch to electrically connect the radio receiver to the NFC antenna if a second listening device other than the first listening device is selected among the plurality of listening devices when the radio application executed,
    wherein the first listening device includes earphones and the second listening device includes at least one of a speaker or a wireless headset.

2. The electronic device of claim 1, wherein the NFC antenna comprises at least one radiation unit, and each of the radiation units comprises at least one loop.

3. The electronic device of claim 1, wherein the NFC antenna is configured to receive a signal in a band ranging from 13 MHz to 109 MHz.

4. The electronic device of claim 1, comprising a low-noise amplifier configured to amplify the FM signal received through the NFC antenna.

5. A method for receiving a radio signal in an electronic device, the method comprising:
    displaying a listening device selection screen for selecting a listening device among a plurality of listening devices;
    controlling a switch to electrically connect a radio receiver to an earphone connector if a first listening device is selected among the plurality of listening devices when a radio application is executed, and
    controlling the switch to electrically connect the radio receiver to an NFC antenna if a second listening device other than the first listening device is selected among the plurality of listening devices when the radio application executed,
    wherein the first listening device includes earphones and the second listening device includes at least one of a speaker or a wireless headset.

6. The method of claim 5, wherein the NFC antenna is configured to receive a signal in a band ranging from 13 MHz to 109 MHz.

7. A method for receiving an FM radio signal in an electronic device, the method comprising:
    electrically connecting a radio receiver configured to receive an FM radio signal to an earphone connector through a switch if a listening device is connected to an earphone connector of the electronic device, when a radio application is executed; and
    electrically connecting the radio receiver configured to receive the FM radio signal to a Near-Field Communication (NFC) antenna which is capable of receiving the FM radio signal through the switch if the listening device is not connected to the earphone connector of the electronic device, when the radio application is executed.

8. The method of claim 7, further comprising:
amplifying the FM radio signal received through the NFC antenna using an amplifier.

9. The method of claim 7, wherein the NFC antenna is configured to receive a signal in a band ranging from 13 MHz to 109 MHz.

* * * * *